July 19, 1966  B. A. ANDERSSON  3,261,520
VEHICLE LUGGAGE RACK
Filed Feb. 28, 1964  3 Sheets-Sheet 1
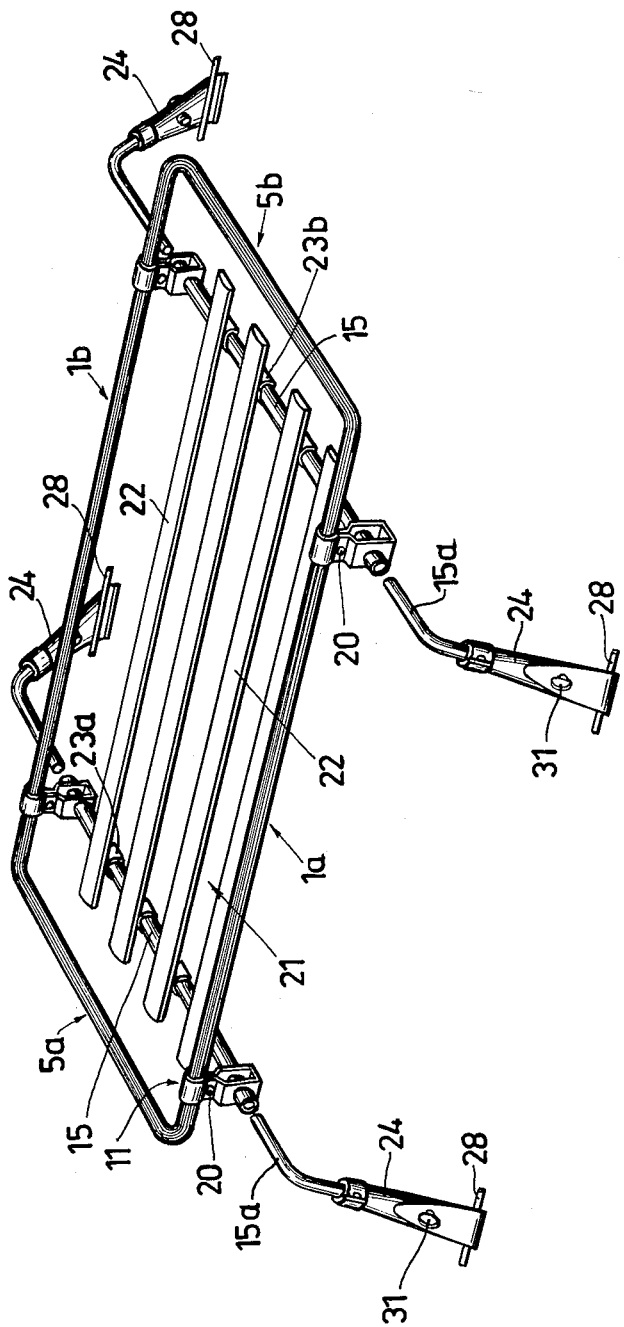
INVENTOR
BROR ADOLF ANDERSSON
By Linton and Linton
ATTORNEYS

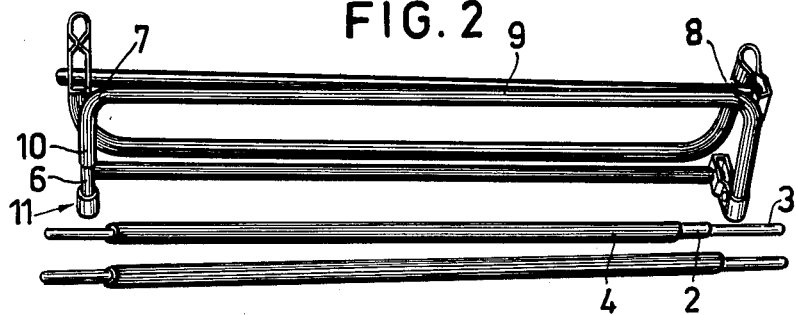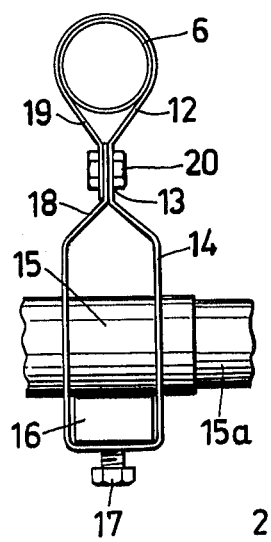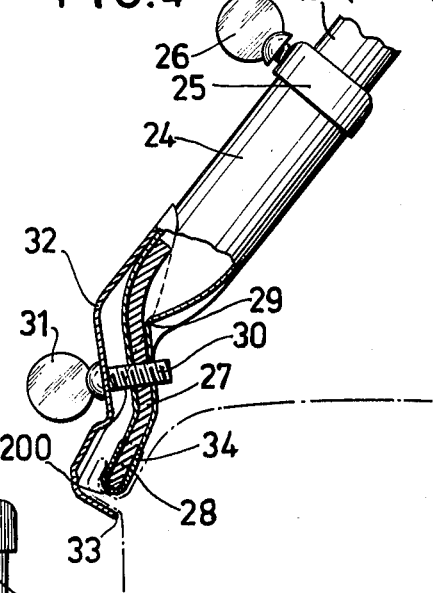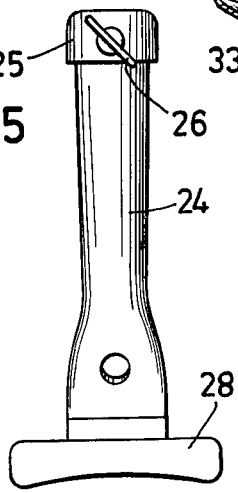

United States Patent Office 3,261,520
Patented July 19, 1966

1

3,261,520
VEHICLE LUGGAGE RACK
Bror Adolf Andersson, Toarpsdal, Boras, Sweden
Filed Feb. 28, 1964, Ser. No. 348,171
5 Claims. (Cl. 224—42.1)

The present invention relates to luggage racks which are intended for use on motor vehicles and is more particularly directed to luggage racks which consists of parts which are releasably connected together.

Such luggage racks must be easily assembled and disassembled and must take up the smallest possible amount of space in their folded state. Furthermore, they must be inexpensive to manufacture.

It is the principal object of the present invention to provide a rack which complies with all these requirements. Due to the fact that the various parts of the rack lock each other reciprocally, so that screws and other connecting members are not required for this purpose, the assembly becomes as simple as possible and, at the same time, the parts of the rack each require very little space.

The present luggage rack can be manufactured cheaply, since the design is such that no welding operations whatsoever are necessary for the manufacture of the parts of the rack. This factor is of decisive importance, since the operations replacing the hitherto unavoidable welding operation permit mass production at significantly lower cost.

The invention relates to luggage racks of the type comprising a dismantleable, rectangular frame, the short sides of which are connected with the long sides in such manner that the former require to be pushed in a direction away from each other or towards each other before they can be removed from the long sides.

The invention is characterized in that the rack is provided with tubes, extending in the transverse direction of the rack for receiving on the one hand the members intended for securing the rack on the edge of the roof of the vehicle, and on the other hand carrier tubes, for the luggage, extending in the longitudinal direction of the rack and being provided with resilient bows adapted to engage around the transverse tubes in such a manner that they prevent the short sides of the frame from being removed from the long sides.

Further characterising features of the invention are disclosed in the following description.

The accompanying drawings show, by way of example, two embodiments of the invention and also a number of details thereof.

FIG. 1 is a perspective view of a first embodiment of the present luggage rack with the securing members before attachment thereto.

FIG. 2 is an exploded view of the rack before assembly.

FIG. 3 is an enlarged end view of one of the connecting members.

FIG. 4 is a side view partly in section of a securing member for the luggage rack.

FIG. 5 is a front view of said securing member without closure means.

Referring now more particularly to the accompanying drawings wherein like and corresponding parts are designated by similar reference characters, the embodiment, shown in FIGS. 1–2, consists of a rectangular frame, which is preferably manufactured from light metal tubing

Figures 6, 7, 8:
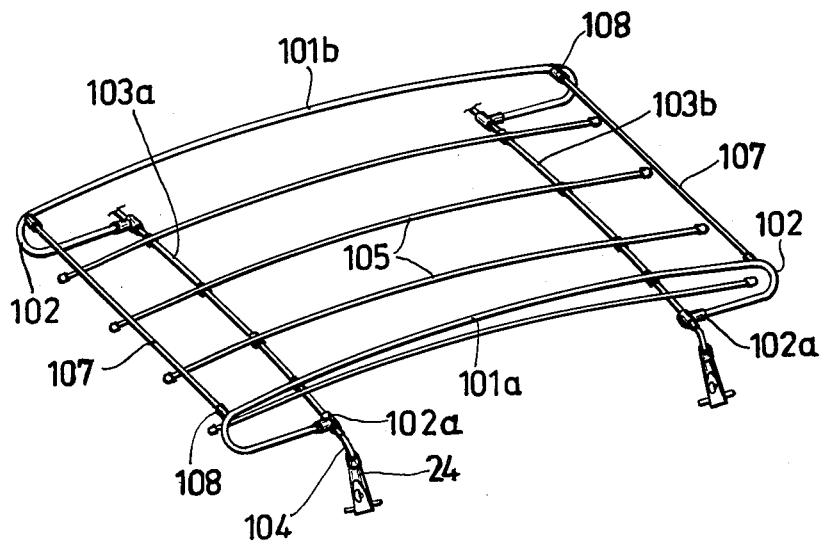
FIG. 6 is a perspective view of another embodiment of the invention.
FIG. 7 is a view of one of the resilient bows, as seen in the transverse direction of the rack.
FIG. 8 is an enlarged side view of the connection between a securing member and a transverse tube of the rack.

2 and has long sides 1a and 1b which consists of tubes 2, see FIG. 2, having, at their ends, thinner projecting pins or tubes 3. Said tubes 1a and 1b are preferably covered with plastic tubes or the like 4. The short sides 5a, 5b of the frame consist of light metal tubes 6 having the same dimensions as the tubes 2. The tubes 6 are bent at right-angles at 7 and 8, thus forming U-shaped units, the parts 9 of which extend in the transverse direction of the rack, and the units are advantageously covered with plastic tubing, like the tubes 2.

At their free ends, the frame short sides 5a, 5b have downwardly directed connecting members 11, preferably manufactured from curved sheet-metal. As will be seen from FIG. 3, said sheet-metal connecting members extend around the respective tube parts 6 and each then extends as at 12, obliquely and downwardly, so as to form a vertical portion 13, whereafter they are again curved outwardly and extend vertically and downwardly providing limbs 14. They then extend horizontally providing base 14a and once again upwardly and finally extend inwardly as at 18 so as to form a further vertical portion 13. The other end of said connecting member extends obliquely and downwardly at 19 and then vertically and downwardly to form a further limb 14. A screw 20 extends through the portions 13 so that the member 11 can be made fast with the tube 6. The lower vertical limbs 14 of the connecting member 11 are formed with coaxial apertures through which the tube 15, extending in the transverse direction of the rack, extend. Tubes 15 are held fast in the desired position by screws 17 extending through base 14a and nuts 16 disposed between the limbs 14.

Angular tubes 15a have one end in tubes 15 and the opposite end in tubes 24 as described more fully hereinafter, see FIG. 8.

The carrier tubes 21 of the luggage rack consists of light-metal tubes 22 each of which has, on its underside, two resilient bows 23a and 23b spaced apart in such manner that, in the operative position of the rack, they hold the parts thereof fast. When the rack is assembled, the pins 3 of the longitudinal sides 1a, 1b are introduced into the free ends of the short side tubes 6, whereafter the carrier tubes 21 are secured, by hooking their resilient bows on the transversely-extending tubes 15. It is self-evident that said carrier tubes in this way hold the rack fast in its assembled position.

The second embodiment shown in FIG. 6 differs from the embodiment just described, in that the long sides 101a and 101b have their ends bent towards each other as at 102 while T-shaped coupling members 102a have the ends of said long side extending therein and short side 103a, 103b extending therethrough as shown in FIG. 6, so that the short sides 103a, 103b have to be pushed towards each other before they can be removed from the long sides. Said short sides also have bent ends 104 for securing the rack to the roof A of the vehicle and to carry the carrier tubes 105 for the luggage. The resilient bows 106 carried by the tubes 105, see FIG. 7, may have their ends curved outwardly to facilitate the assembly, but this is not necessary. Cross bars 107 are inserted in sockets 108 fixedly connected to the long sides 101a and 101b.

The invention includes furthermore a process for the manufacture of a securing member for applying the luggage rack on the vehicle roof. A per se known securing member of this kind includes a light metal tube 24 having at one of its free ends a loosely-secured ring 25 the purpose of which is, together with the tube 24, to provide an adequate "hold" for the screwthread of a screw 26 for securing the securing member on bent ends 104 or bent tubes 15a telescopically displaceable in the tubes 15. Said known securing member is modified according to the present invention by inserting in the tube 24 a flat, T-shaped securing plate 27 the transversely-extending part 28 of which can preferably be covered with a rubber or plastic protecting means 34. Then the tube 24 with the part of the securing plate 27 disposed therein, is bent over in a single operation, the main bending action taking place at 29. Due to the bending action, the securing plate is permanently held fast in the tube 24. A thumb screw 30, having a flat head 31, extends through both the tube 24 and said securing plate and serves to guide the abutment edge 33 of the closure member 32 in the direction towards or away from the transversely-extending part 28 of said securing plate, for the purpose of applying or removing the arrangement to or from the vehicle roof A having a drip rail 200.

The invention is of course not limited to the embodiments described hereinabove, but can be varied within the scope of the claims.

I claim:

1. A dismountable car top carrier for attachment to a vehicle roof having a drip rail, comprising cross-bars, having bent ends, brackets detachably secured to the bent ends of said cross-bars to engage the drip rail for attaching the top carrier to said vehicle roof, a framing having long sides and short sides and means supporting said framing on said cross-bars in such a way that said cross-bars at the assembling or dismounting of the top carrier are guided in the longitudinal direction of the top carrier for connecting and disconnecting respectively to the ends of the long-sides of the framing, and longitudinal bars, spaced resilient clips carried by said longitudinal bars adapted to engage at least two of said cross-bars for securing said longitudinal bars to said cross bars and to hold said cross-bars and said framing in their mounted positions and to prevent them from moving in the longitudinal direction of said top-carrier.

2. A dismountable car top carrier according to claim 1, wherein said cross-bars are connected directly to the long sides of said framing.

3. A dismountable car top carrier according to claim 1, wherein said cross-bars are connected to long sides of the framing by means of brackets secured to the ends of the short sides of the framing.

4. A car top carrier as claimed in claim 1, wherein said framing is in a common horizontal plane.

5. A car top carrier as claimed in claim 1, wherein two of said cross bars form the short sides of said framing.

References Cited by the Examiner

UNITED STATES PATENTS

| 2,772,825 | 12/1956 | Binding | 224—42.1 |
| 2,919,841 | 1/1960 | Helm | 224—42.1 |
| 3,109,569 | 11/1963 | Hare | 224—42.1 |
| 3,132,780 | 5/1964 | Binding | 224—42.1 |

GERALD M. FORLENZA, *Primary Examiner.*

HUGO O. SCHULZ, *Examiner.*

J. OLDS, *Assistant Examiner.*